(12) United States Patent
Lincoln et al.

(10) Patent No.: US 7,319,862 B1
(45) Date of Patent: Jan. 15, 2008

(54) BLOCK-BASED ENCODING AND DECODING INFORMATION TRANSFERENCE SYSTEM AND METHOD

(75) Inventors: Larry A. Lincoln, Milpitas, CA (US); Frank Robert Nemirofsky, Alamo, CA (US)

(73) Assignee: Exphand, Inc., San Ramon, CA (US)

( * ) Notice: Subject to any disclaimer, the term of this patent is extended or adjusted under 35 U.S.C. 154(b) by 406 days.

(21) Appl. No.: 10/673,047

(22) Filed: Sep. 26, 2003

Related U.S. Application Data

(60) Provisional application No. 60/413,926, filed on Sep. 26, 2002.

(51) Int. Cl.
*H04M 11/10* (2006.01)
(52) U.S. Cl. .................. 455/414.1; 455/466; 455/14; 455/52; 455/57
(58) Field of Classification Search ............ 455/414.1, 455/466, 14, 52, 57; 705/14, 52, 57
See application file for complete search history.

(56) References Cited

U.S. PATENT DOCUMENTS

| 6,526,275 B1* | 2/2003 | Calvert ...................... 455/418 |
| 2001/0018336 A1* | 8/2001 | Okajima et al. ............ 455/403 |
| 2002/0029253 A1* | 3/2002 | Rhoads ...................... 709/217 |
| 2003/0050893 A1* | 3/2003 | Hirabayashi ................ 705/52 |
| 2003/0052859 A1* | 3/2003 | Finley ........................ 345/156 |
| 2003/0096625 A1* | 5/2003 | Lee et al. ................... 455/466 |

* cited by examiner

*Primary Examiner*—Joseph Feild
*Assistant Examiner*—Sheila B. Smith
(74) *Attorney, Agent, or Firm*—Mark J. Spolyar

(57) ABSTRACT

Methods, apparatuses, and systems enabling an information exchange system allowing for the transmission of a message carrier containing at least one message code along with video and television data, as well as subsequent capture and decoding of the message carrier to identify the at least one message code. As discussed herein, implementations of the invention can be used in connection with an electronic commerce and data interchange system featuring a Universal Digital Assistant (UDA) that facilitates financial transactions and data interchange, as well as dissemination, management and exchange of commercial information (e.g., advertising, promotions, sales announcements, and the like) and personal information (e.g., address and other contact information, driver's license number, and memberships). The invention, in one implementation, provides an end-to-end e-commerce solution that can transform a mobile phone/PDA (Personal Digital Assistant) into a Universal Digital Assistant configured to receive data (e.g., advertising, promotions, and sales announcement information) based on message codes encoded into message carriers disseminated through advertising and content from analog and digital television broadcasts, television receivers, the Internet, wireless signals, radio broadcasts, satellite broadcasts, and print media.

9 Claims, 9 Drawing Sheets

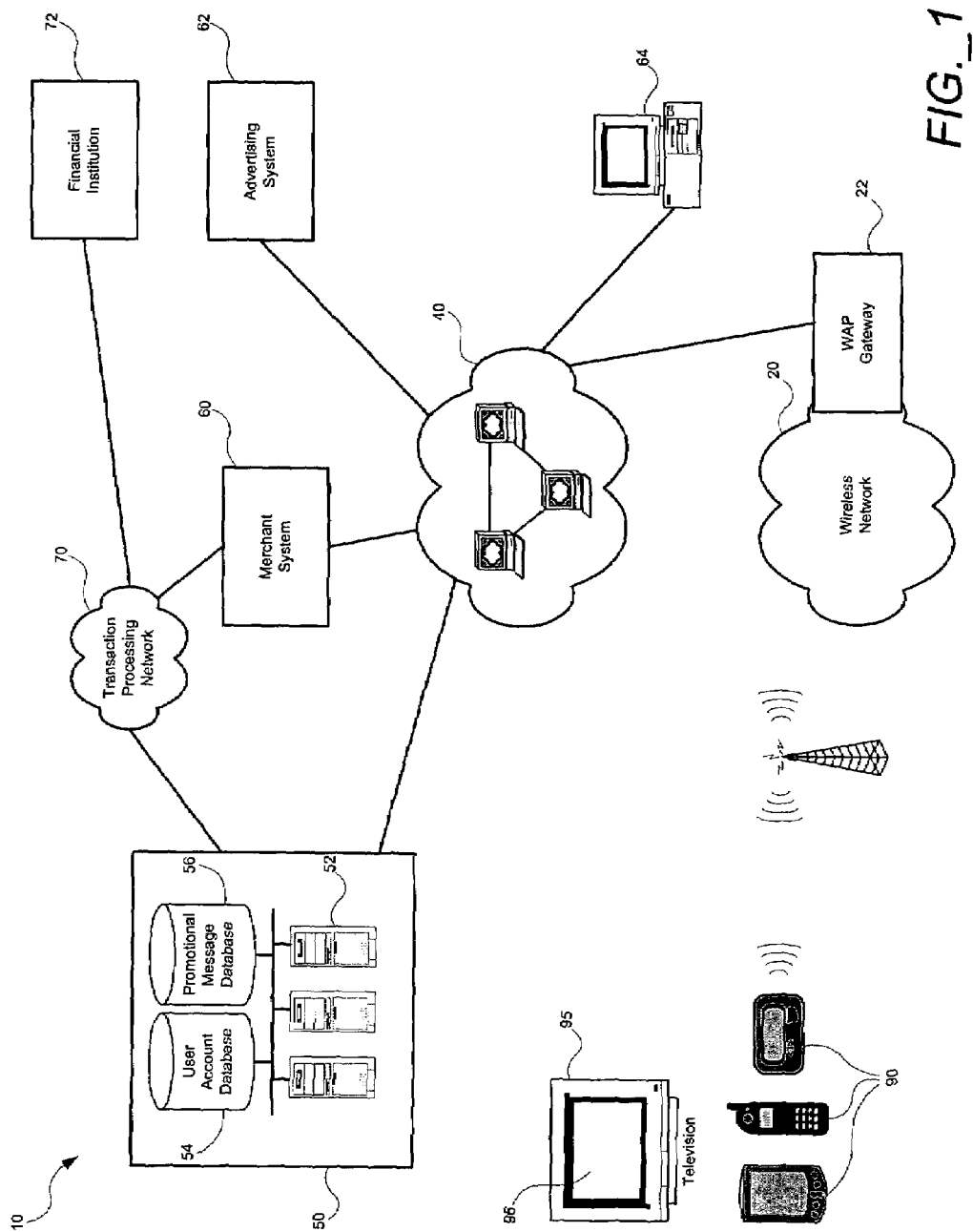
FIG._1

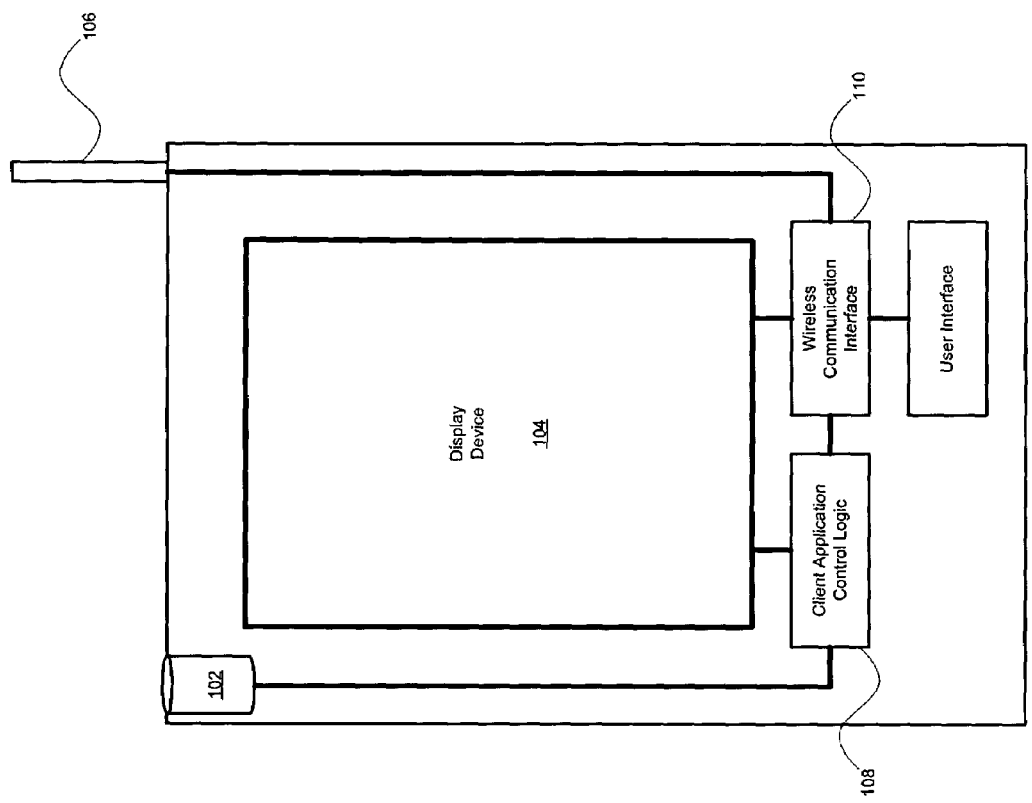
FIG._2

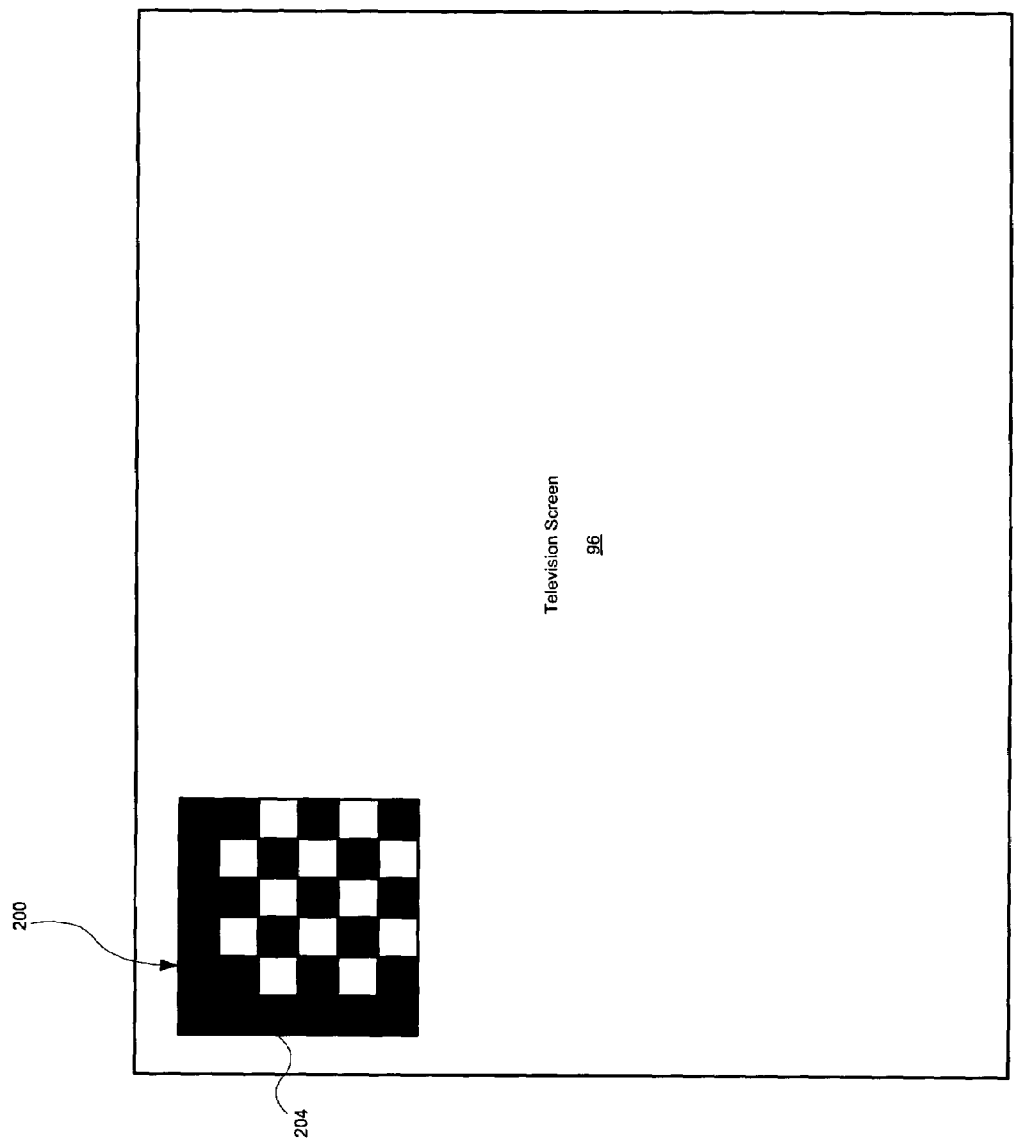

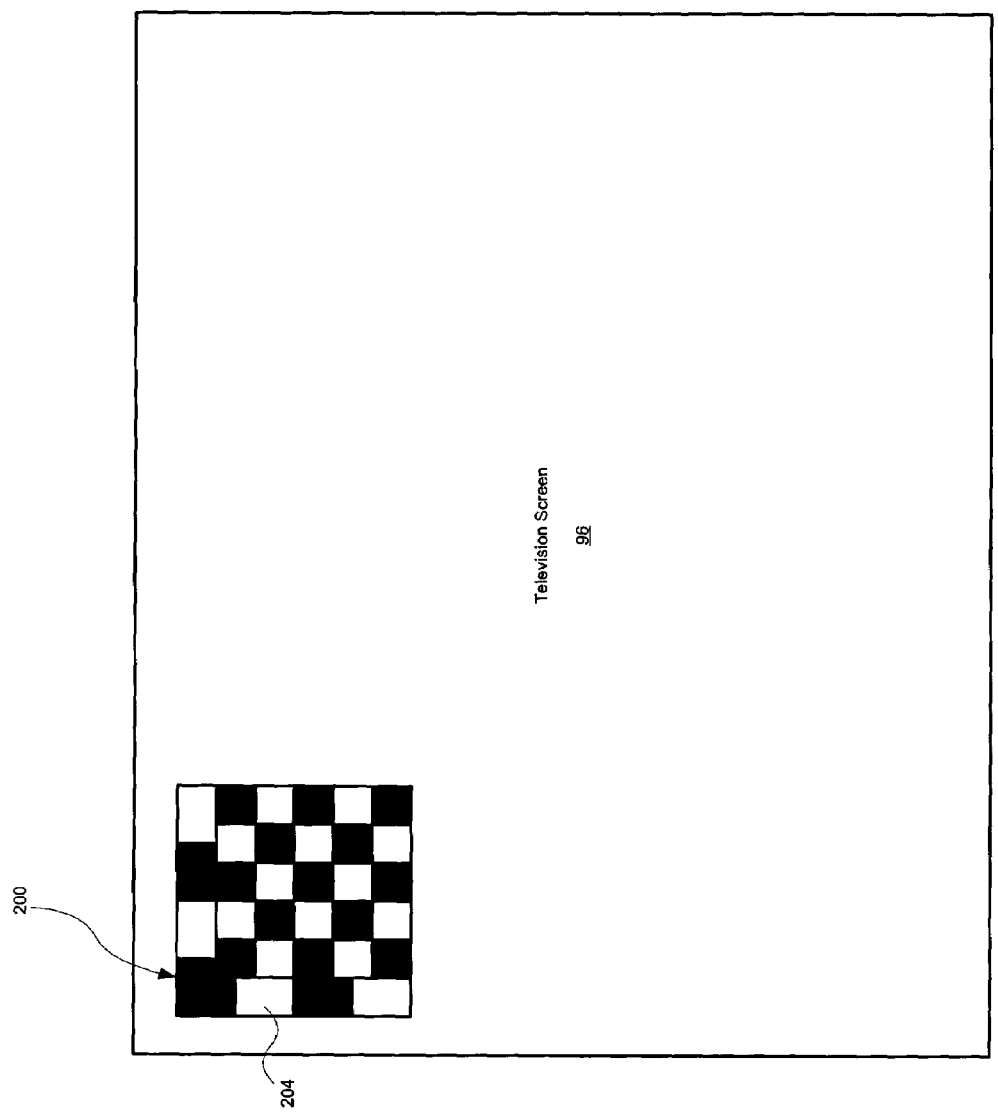
FIG._3B

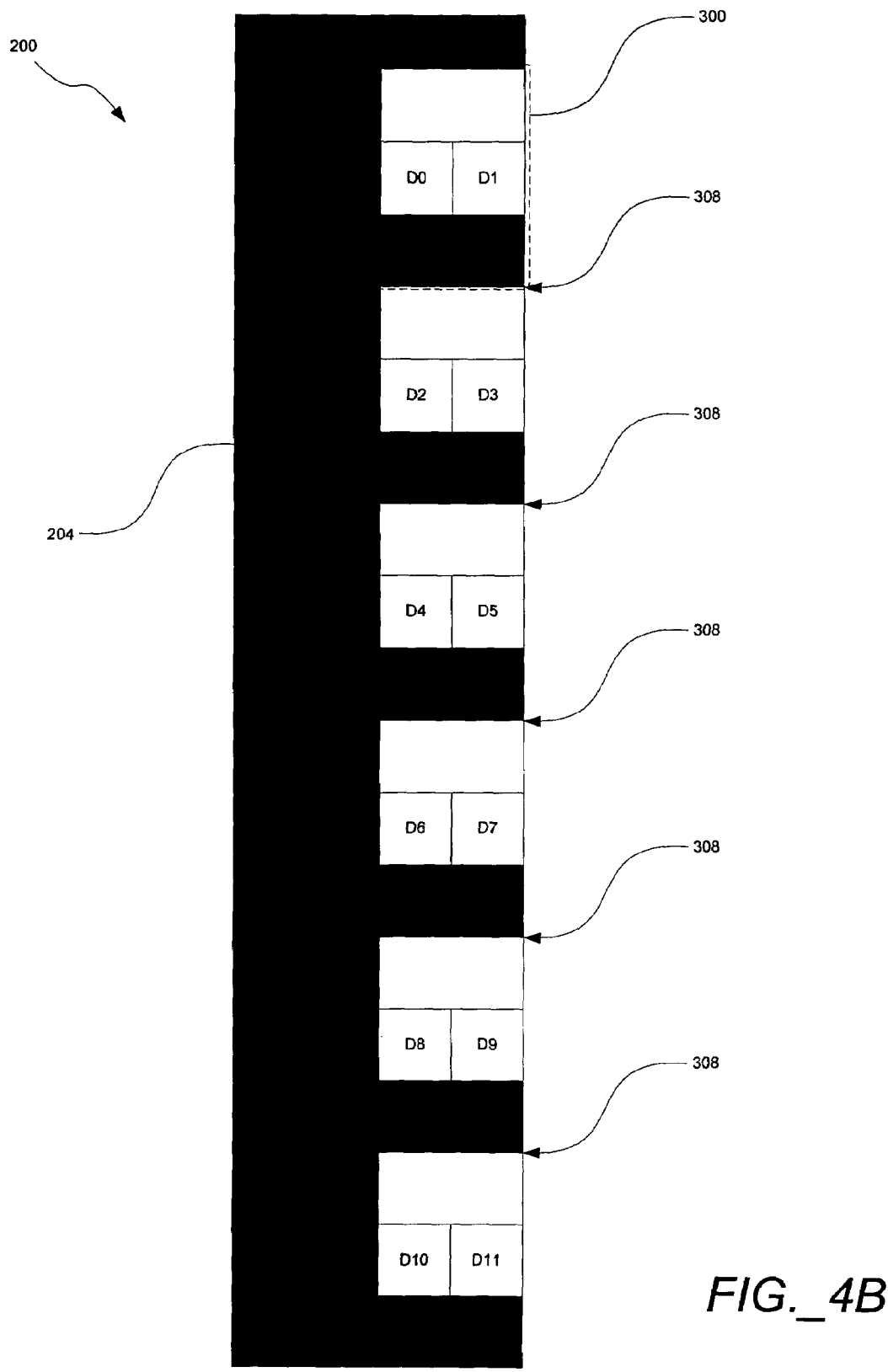
FIG._4B

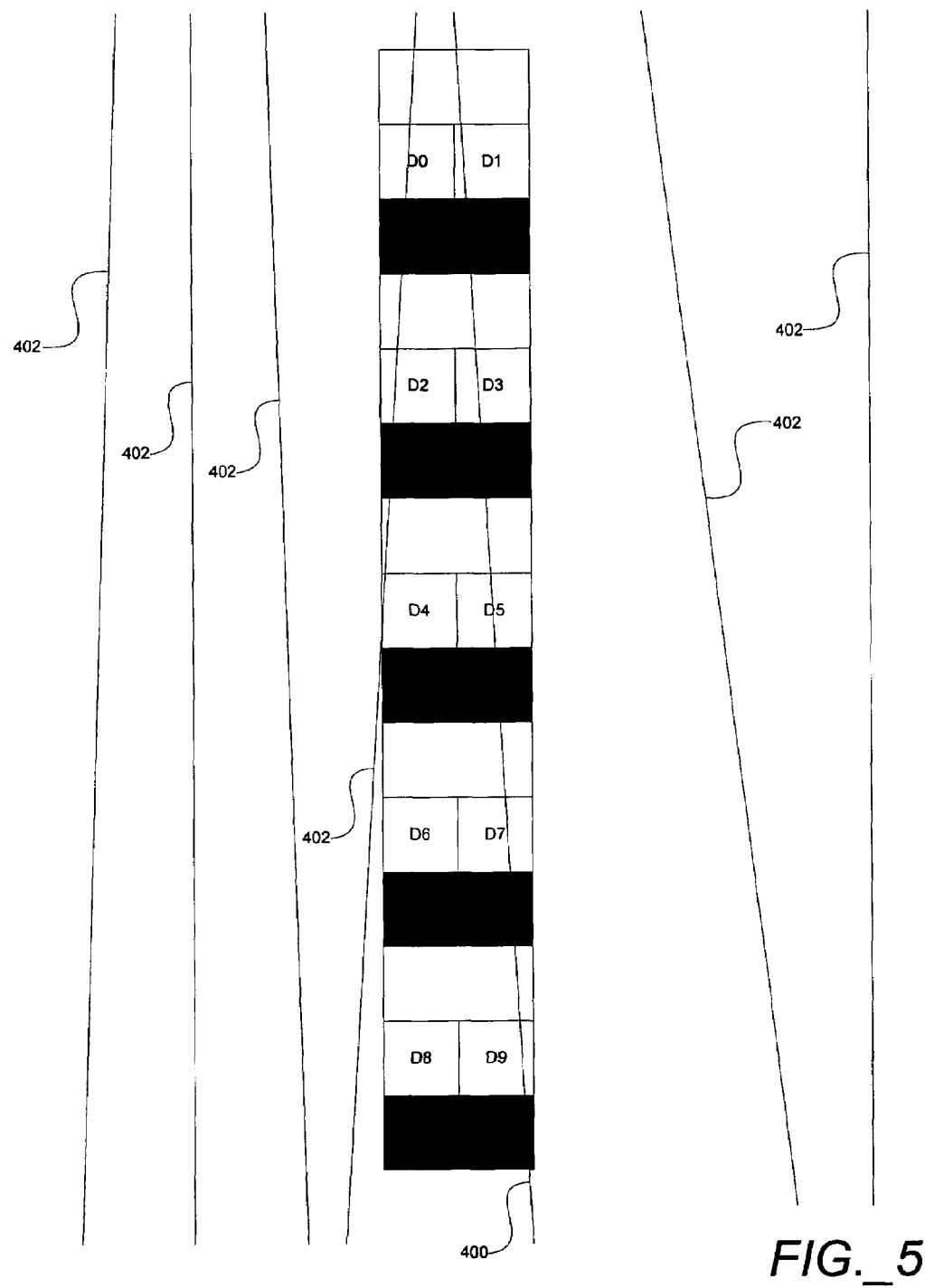
FIG._5

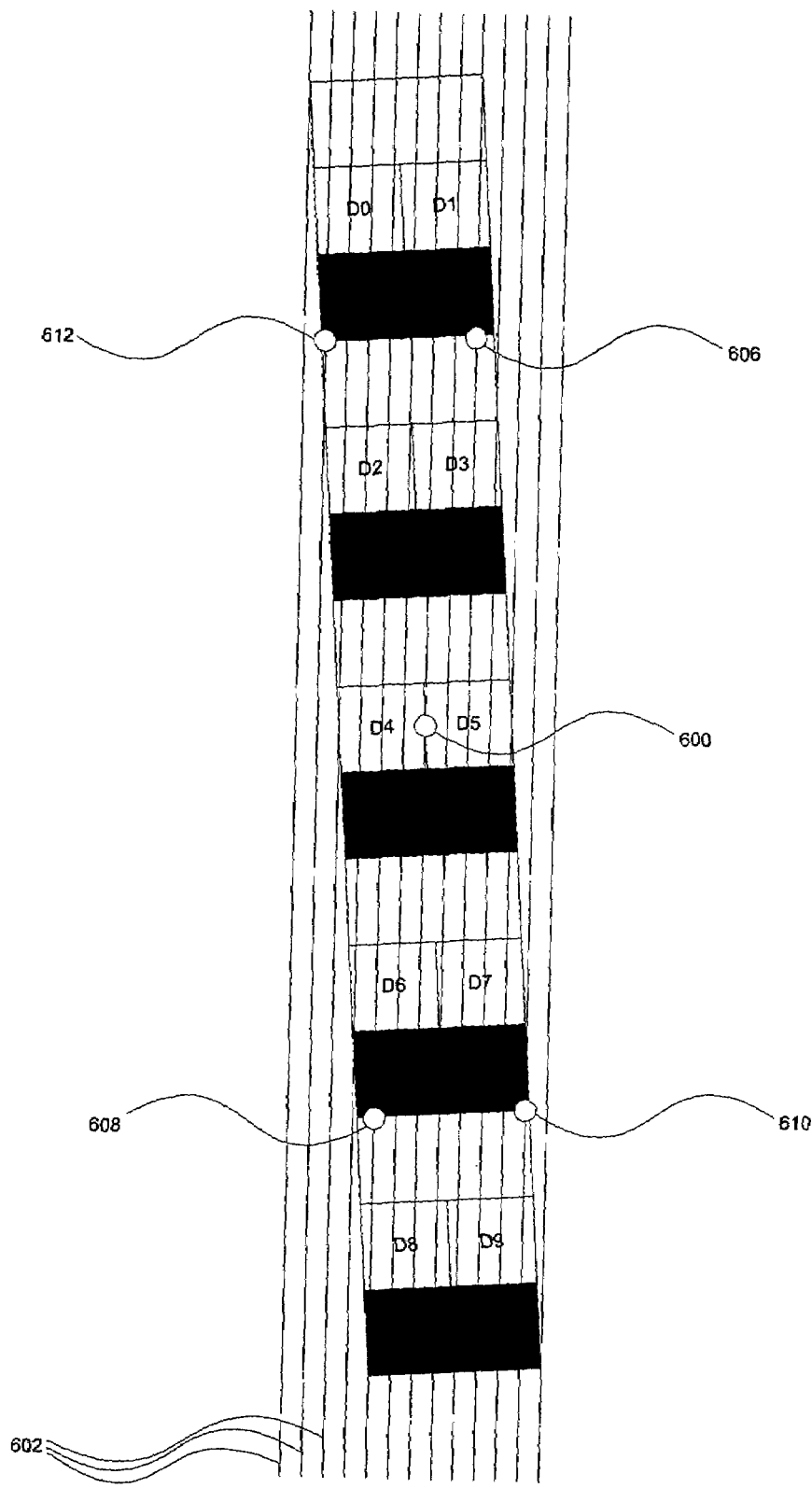
FIG._6

BLOCK-BASED ENCODING AND DECODING INFORMATION TRANSFERENCE SYSTEM AND METHOD

CROSS-REFERENCE TO RELATED APPLICATION

The present application claims the benefit of U.S. Provisional Application Ser. No. 60/413,926 filed Sep. 26, 2002.

FIELD OF THE INVENTION

The present invention relates to data encoding and decoding systems and, in one implementation, to an interactive electronic commerce system that utilizes code blocks to communicate message codes to users viewing television and other video images.

BACKGROUND OF THE INVENTION

Except for the emergence of the Internet, there have been few significant improvements in the way consumers can quickly and easily retrieve information for, or promotions pertaining to, products they see. When a consumer views product advertisements on television or in print media, they often want further information about the products. Consumers may also desire special promotions or deals for these products. This requires a consumer to first remember which products they want further information on, and then go and find this information using mediums such as the Internet or newspapers. For example, when a person sees a product displayed on television and desires further information, he must remember characteristics about the product. At a later time, the person can enter those characteristics as search terms in a typical search engine. Alternatively, assuming the broadcast advertisement or program displays an "800" number, the person may use the number and access a telephone operator or call center to obtain more information and/or order the item. Beyond these methods, however, there are few ways of quickly gathering further information on, or promotions for, products based upon an observation of a television or print advertisement. In light of the foregoing, it can be seen that a need exists for alternative methods of quickly obtaining information about such products.

SUMMARY OF THE INVENTION

The invention provides methods, apparatuses, and systems enabling an information exchange system allowing for the transmission of a message carrier containing at least one message code along with video and television data, as well as subsequent capture and decoding of the message carrier to identify the at least one message code. As discussed herein, implementations of the invention can be used in connection with an electronic commerce and data interchange system featuring a Universal Digital Assistant (UDA) that facilitates financial transactions and data interchange, as well as dissemination, management and exchange of commercial information (e.g., advertising, promotions, sales announcements, and the like) and personal information (e.g., address and other contact information, driver's license number, and memberships). The invention, in one implementation, provides an end-to-end e-commerce solution that can transform a mobile phone/PDA (Personal Digital Assistant) into a Universal Digital Assistant configured to receive data (e.g., advertising, promotions, and sales announcement information) based on message codes encoded into message carriers disseminated through advertising and content from analog and digital television broadcasts, television receivers, the Internet, wireless signals, radio broadcasts, satellite broadcasts, and print media.

DESCRIPTION OF THE DRAWINGS

FIG. 1 sets forth a computer network environment including an interactive electronic commerce system.

FIG. 2 is a block diagram illustrating the functionality associated with a universal digital assistant.

FIG. 3A illustrates a screen display including one implementation of a checkerboard message carrier.

FIG. 3B illustrates a screen display including another implementation of a checkerboard message carrier.

FIG. 4B illustrates six modules used in forming a message carrier.

FIG. 5 illustrates the location and examination of vertical scan lines in captured images to locate a message carrier.

FIG. 6 illustrates vertical scan lines being used to locate the center of a message carrier.

DESCRIPTION OF THE PREFERRED EMBODIMENTS

Figure 3C:
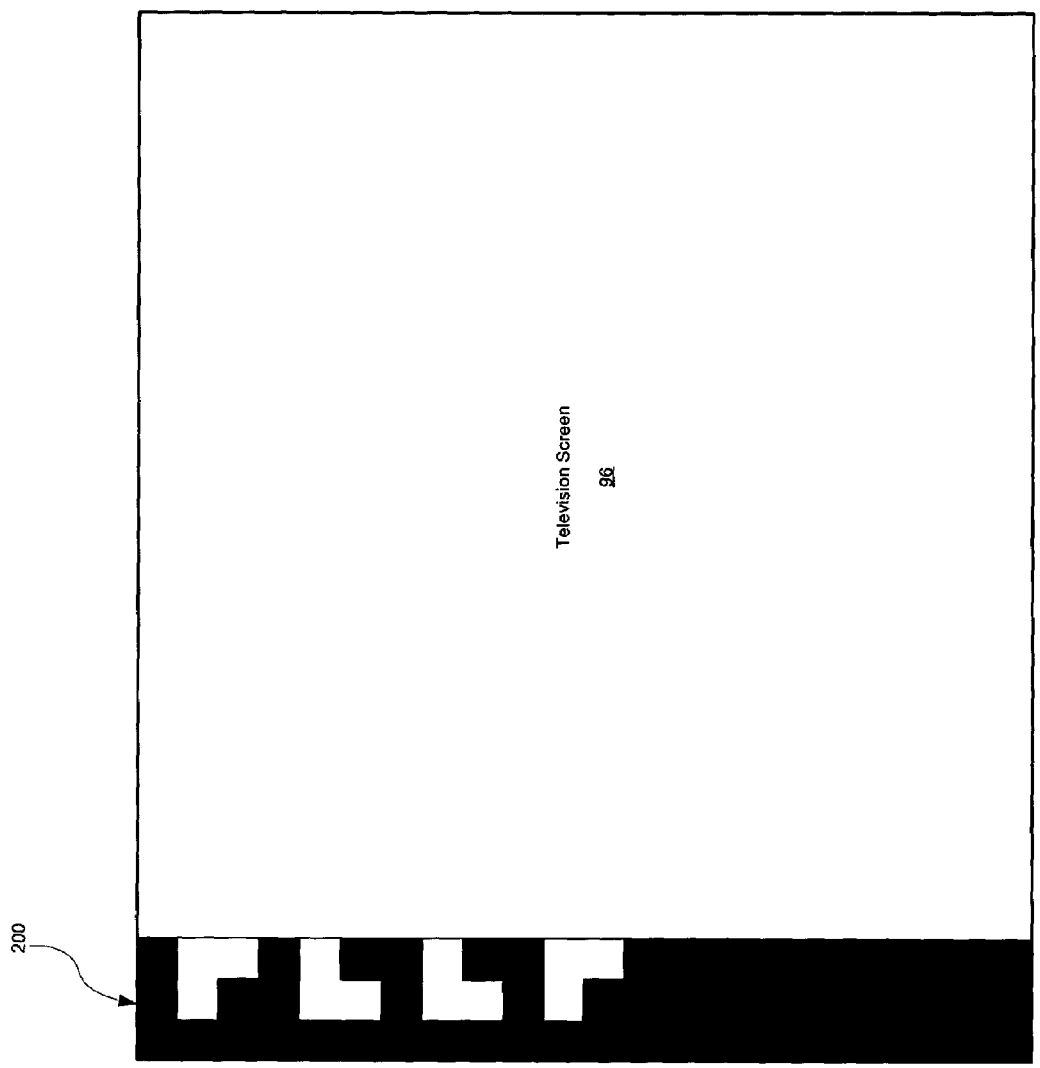
FIG. 3C illustrates a screen display including a vertical strip message carrier.

FIG. 1 illustrates an electronic commerce system 10 utilizing a data encoding and decoding scheme according to one implementation of the invention. As FIG. 1 illustrates, electronic commerce system 10 includes one or more universal digital assistants (UDA) 90 that can receive data from a media source, for example, a display device 95 having a display screen 96. Electronic commerce system 10 also includes a UDA application site 50 that interacts with UDA 90 to facilitate financial transactions and carry out other processes as described herein. UDA 90 interacts with UDA application site 50 through a telecommunications network 20 and a computer network 40. Electronic commerce system 10 can also include a merchant system 60, an advertising system 62, at least one network access device such as client computer 64, at least one transaction processing network 70 (e.g., an Automated Clearing House (ACH) network, credit card network, etc.), and one or more financial institutions 72.

Telecommunications network 20 can be a wireless telephone network (as shown in FIG. 1), a land-based telephone network, and/or a combination thereof. Telecommunications network 20 can be any suitable digital or analog wireless network, such as a Time Division Multiple Access (TDMA) network, a Global System for Mobile communication (GSM) network, or a Code-Division Multiple Access (CDMA) network.

Telecommunications network 20 enables transmission of voice and other data to mobile wireless devices, such as UDA 90. Telecommunications network 20 therefore enables communication between UDA 90 and other systems operably connected thereto. In one implementation, telecommunications network 20 includes a Wireless Application Protocol (WAP) gateway 22, which provides a set of communication protocols enabling wireless devices, such as UDA 90, to access the Internet or similar computer network 40. WAP gateway 22 is operative to establish a connection (e.g., a Wireless Session Protocol (WSP) connection) with UDA 90, to receive requests designating an application server or other resource on computer network 40 from UDA 90, to translate the request into a hypertext transfer protocol (HTTP) or other suitable request to the appropriate application server, to receive a response from the application server, and to translate and transmit the response to UDA 90. Alternatively, the transmission of data between UDA 90 and UDA application site 50 can occur over a Short Message Service (SMS) gateway. In one implementation, the client functionality of UDA 90 is operative to configure SMS messages into a predefined format recognized by UDA application site 50.

Computer network 40 can be any suitable computer network, including but not limited to an Internet Protocol (IP) network, such as the Internet. Computer network 40 can be an open, wide-area network (WAN), an electronic network, an optical network, a wireless network, and/or any combination thereof. Computer network 40 can be a packet-based communications environment, employing Transmission Control Protocol/Internet Protocol (TCP/IP) standards and having a plurality of interconnected digital packet transmission stations operative to route data between TCP/IP end systems. The invention, however, has applications in computer network environments employing any suitable transport layer and network layer protocols.

UDA 90, in one implementation, is a wireless device that provides computing and information storage and retrieval capabilities for applications installed therein. UDA 90 is operative to communicate with remote devices over telecommunications network 20. In one implementation, UDA 90 includes hardware and/or software operative to acquire message codes using one or more code capture technologies and then communicate such codes to UDA application site 50. UDA application site 50 is operative to return at least one promotional message to UDA 90 for display or other action to the user. The functionality associated with UDA 90 can be integrated into a variety of wireless device platforms, such as cell phones, wireless personal digital assistants (PDA), universal remote controllers, television remote controllers, pagers, wearable computing devices, and the like. In one implementation, the functionality of UDA 90 is incorporated into a television or set-top television receiver remote control unit.

UDA 90 can further include short-range wireless functionality for wireless communication of data with a second device, such as a point-of-sale (POS) terminal or any other suitably configured device. This functionality can be implemented using, for example, infrared signals (e.g., IrDA), radio signals (e.g., 802.11 technologies (Wi-Fi) or Bluetooth), short burst Ethernet, wireless network signals (e.g., GSM, TDMA, or CDMA), and message services such as SMS and Multimedia Message Service (MMS). Such functionality allows UDA 90, for example, to transmit credit card account information and other information directly to a POS terminal equipped with complementary wireless communication functionality.

UDA 90, in one implementation, is also operative to receive data from telecommunications network 20 (or computer network 40) and transmit data to telecommunications network 20 (or computer network 40) for routing to appropriate devices. UDA 90, in one implementation, is an Internet-enabled device capable of receiving data from remote servers and displaying data on a user interface screen. In one implementation, UDA 90 is a WAP-enabled device, such as a WAP mobile phone, that includes a WAP client (e.g., a Wireless Application Environment (WAE) user agent, such as a WAP browser, and a Wireless Telephony Application (WTA) user agent). In another implementation, UDA 90 can be a wireless PDA including HTML compliant or HTML-supported browser functionality, such as Pocket PC including Pocket Internet Explorers (PIE), which is a mobile version of Microsoft's Internet Explorer®, including limited Javascript support and the ability to display HTML and Macromedia Flash files (assuming the Flash plug-in is installed).

FIG. 2 is a block diagram illustrating the functionality of UDA 90 according to one implementation of the invention. As FIG. 2 illustrates, UDA 90 includes an image capture device 102, a display device 104, an antenna 106, a client application control logic 108, and a wireless communication interface 110.

Client application control logic 108 executes the client-side functionality described herein, such as processing images to acquire message codes and transmitting the message codes through wireless communication interface 110 to UDA application site 50. The image processing functionality of client application control logic 108 can process a digital image by reading intensity values of the pixels that form the image, and then analyzing those intensity values to identify patterns or other behavior. Generally, the pixels are read by scanning vertical columns of pixels in the image, known as vertical scan lines. The pixel values can also be read by scanning horizontal rows of pixels, known as horizontal scan lines. Wireless communication interface 110 is operative to establish and maintain a connection to telecommunications network 20 using antenna 106 to enable communication of data between UDA 90 and remote devices.

Image capture device 102 is operative to capture images of message carriers and message codes transmitted in visual media. Depending on the message encoding technology employed, for example, image capture device 102 can comprise a photo detector and associated circuitry as disclosed in U.S. Pat. No. 5,594,493 or U.S. Pat. No. 3,848,082. Alternatively, image capture device 102 can comprise a digital camera allowing for the capture of images containing message codes. Display device 104 is a liquid-crystal or other display device. In one implementation, display device is a touch-sensitive liquid crystal display device.

As one skilled in the art will recognize, the functionality described above can be integrated into existing wireless device platforms. For example, client application control logic 108 can be implemented into a wireless phone with an embedded runtime environment such as Java. The runtime environment can execute a script or byte code program to perform the functions described herein and use the wireless communication system of the phone to transmit and receive data from remote devices.

UDA application site 50 is connected to computer network 40 to communicate with end systems and other nodes operably connected thereto, such as client computer 64. UDA application site 50 interacts with UDA 90 through computer network 40, WAP gateway 22, and wireless telecommunications network 20 to facilitate data interchanges, financial transactions, and other operations as described herein. UDA application site 50 can be configured to support a variety of wireless devices, including IMode phones, and mobile wireless devices including Binary Runtime Environment for Wireless (BREW) or Java 2 Platform Micro Edition (J2ME) technologies. In one implementation, UDA application site 50 includes at least one application server 52, a user account database 54, and a promotional message database 56.

Application server 52 includes functionality implementing the process flows described herein. User account database 54 stores information related to at least one user account. Such user account information includes a user account identification, name, address, e-mail address, as well as system settings, preferences, user profile information (e.g., psychographic information, demographic information, and behavioral information) obtained by monitoring a user's use of the system or by direct interaction with the user through questionnaires and the like. User account database 54 can also store financial account information for at least one user to facilitate financial transactions using UDA 90.

Promotional message database 56 stores promotional messages, such as advertisements, coupons, and other commercial offers, in association with one or more message codes. In one implementation, advertising system 62 transmits promotional messages in electronic form to promotional message database 56 for storage in association with message codes. In another implementation, application server 52 can receive a message code from UDA 90 and return one or more promotional messages associated with that message code, as discussed herein.

UDA 90 operates in connection with UDA application site 50 to enable users to receive and review advertising, promotional, informational and other messages, as well as conduct financial transactions and other operations. According to an implementation of the invention, UDA 90 acquires message codes (e.g., from television advertisements or print advertisements) and transmits them to UDA application site 50, which pushes an advertising or promotional message back to UDA 90 in return. Advertising and promotional messages can take a variety of forms, including but not limited to electronic coupons, product pricing, descriptive data, loyalty offerings, and other similar items. According to one implementation, a user can elect to save the advertising or promotional message for later use or inspection by storing it locally on UDA 90 or remotely on UDA application site 50 in association with his or her user account.

To facilitate initiation and maintenance of user accounts, users may access UDA application site 50 through network access devices over computer network 40 to manage their respective user accounts through network access devices connected to computer network 40. In one implementation, the network access device is a browser executed on a client computer 64, or another browser executed on a network computer (not shown). In one implementation, page-based interfaces for accessing UDA application site 50 are transmitted to client computer 64 having a browser and a connection to computer network 40.

Client computer 64 can include any computer, special-purpose computing device, or any other suitable device having the required functionality. In one implementation, client computer 64 includes at least one processor, a data storage system (including volatile and non-volatile memory), at least one input device (e.g., a keyboard), and at least one output device (e.g., a display). In one implementation, client computer 64 is connected to computer network 40 through a modem connection (e.g., dial-up, DSL, or cable) or through a network line. Such connections can be wireless as well. In addition, although implementations of the system are described as working in conjunction with a browser, any suitable device, application, or client software for receiving, displaying, and transmitting data over a computer network can be used. In one implementation, the browser implemented on client computer 64 supports the SSL ("Secure Sockets Layer") protocol, the S-HTTP or HTTPS ('Secure HTTP') protocol, or any other similar protocol for transmitting confidential or private information over an open computer network. Users are individuals or other legal entities having the capacity to possess financial accounts, such as corporations, partnerships, non-profit organizations, trusts, and the like.

Client computer 64 is a TCP/IP end system operably connected to computer network 40 via any suitable means, such as through an Internet Services Provider (ISP) and the like. Client computer 64 can be any suitable internet-enabled computing device, including but not limited to a desktop computer, a laptop computer, a cell phone, a personal digital assistant (PDA), or UDA 90 having wireless or wired access to computer network 40. The wireless or wired access can be through a router, a wireless router executing the 802.11 wireless protocol, Mobitex, DataTAC, General Packet Radio Service (GPRS), or any other packet-switched wireless network. In one implementation, client computer 64 includes internet browsing software for receiving, displaying, and transmitting data over a computer network.

Payment transaction processing network 70 supports a variety of non-cash payment mechanisms, including but not limited to purchases made by credit card, debit card, and Automated Clearing House (ACH) transactions. In one implementation, payment transaction processing network 70 can be a credit card or debit card transaction processing network, such as Visa®, MasterCard®, Discover®, or American Express®. In one implementation, payment transaction processing network 70 enables users, using UDA 90, to provide non-cash methods of payment to a merchant system 60 or at a POS terminal.

Financial institution 72 is where users maintain financial accounts, such as checking accounts, savings accounts, money market accounts, credit and/or debit card accounts, and other financial accounts. A user can have one or more bank accounts at each of one or more financial institutions. For example, a user can have a checking account and a credit and debit card account at one financial institution and still have a credit account with a different financial institution.

As discussed above, UDA 90 is operative to detect and acquire message codes using one or more code capture technologies. For example, UDA 90 can be configured to acquire message codes from broadcast media, print media, or wireless transmissions. In its most basic form, message codes can be acquired manually by a user inputting a message code directly into UDA 90 using a user interface such as a touch sensitive screen, a numeric key pad, or a voice activated and voice-recognition-based user interface.

In one implementation, UDA 90 is operative to acquire message codes embedded or otherwise transmitted in connection with a television broadcast signal and displayed on a display device 95, such as a television or computer monitor. For example, UDA 90 can include a code capture technology whereby a user can aim UDA 90 at display device 95 and capture an image being shown on screen 96. The captured image or a portion thereof is then processed to locate and identify a message code that is then acquired. For example, UDA 90 can use image capture device 102 to capture an image and then use the image processing functionality of client application control logic 108 to locate and acquire a message code in the captured image. In one implementation of the invention, UDA 90 can emit a beam of light (e.g., a Class II laser pointer) that can assist a user to aim the image capture device of UDA 90 at screen 96. This is useful in situations where the user cannot see what the image capture device is pointed at. In another implementation, the view through the image capture device can be shown to the user on display screen 104 of UDA 90, thereby eliminating the need for a laser pointer.

As shown in FIG. 3A, in one implementation of the invention, the message codes can be presented on a television screen 96 within a message carrier 200 resembling an overt checkerboard-like design that can be captured using image capture device 102. The checkerboard message carrier 200 can be formed using a series of two-dimensional blocks, where two or more colors are used for the blocks. For instance, message carrier 200 of FIG. 3A uses black and white blocks. The blocks can be used to represent bits that form the message code. In such as implementation, image capture device 102 of UDA 90 can capture an image of the checkerboard message carrier, and the image processing functionality of client application control logic 108 can scan the image and read the pattern of blocks, or the transitions between blocks, to acquire the message code.

In another implementation, message codes can be displayed on display device 95 as plain text codes at a predetermined location on screen 96. In such an implementation, the image processing functionality of client application control logic 108 is operative to locate the message code and use text recognition functionality to acquire the message code. In another implementation, message codes are displayed as graphical symbols that UDA 90 processes to acquire the message codes.

In another implementation, the message code can be an arbitrary alphanumeric string that is associated with an advertising or promotional message. UDA 90 can capture an image of the string and translate the string to acquire the message code. In another implementation, the incoming message code can be embedded in the audio track of the television signal. The embedded message code can be subliminal (not perceptible to the user) or overt.

In yet another implementation, UDA 90 operates in connection with a television receiver to acquire message codes. For example, the television receiver can be a satellite or cable receiver that is operative to receive a television broadcast and display the broadcast on display device 95. The television receiver can also be configured to receive message codes that are transmitted to the receiver using any suitable means. For example, the message codes can be transmitted to the receiver in the satellite or cable broadcast, through telecommunications network 20, or through computer network 40. Other methods of transmitting message codes to the receiver are possible as well. UDA 90 can then receive the message codes from the television receiver over a wireless communication path between the television receiver and UDA 90. This wireless communication path can be implemented using infrared (IrDA) signals, Bluetooth signals, 802.11 signals, or any other short range wireless system. This implementation bypasses the need for on-screen message carrier 200.

In one implementation, when a television broadcast displays an offer of interest to the user, user action triggers UDA 90 to contact the television receiver. The television receiver responds by transmitting the message code, and possibly details of the offer, to UDA 90. UDA 90 can then transmit the message code back to UDA application site 50. Alternatively, when the television receiver is contacted by UDA 90, the television receiver can pass the query directly to UDA application site 50, eliminating the need for a communication path between the UDA 90 and UDA application site 50.

Short range wireless communications can be used to transmit message codes to UDA 90 in other contexts as well. For example, alternate devices within the immediate vicinity of UDA 90 can transmit message codes using infrared, Bluetooth, 802.11b, Wi-Fi, or short burst Ethernet technologies. In one implementation, UDA 90 can receive message codes from a transponder located at a variety of physical locations, such as a point of sale location, a movie theater, a mall kiosk, or a restaurant. This enables a user to receive promotional messages that are immediately relevant to business establishments that the user is patronizing or that are nearby. Application server 52 can also identify the relevant advertisement using information delivered to it by equipment monitoring the video stream and other data provided by the advertisers.

In one implementation, UDA 90 is operative to capture message codes from print media and the like. UDA 90 can include image processing functionality in client application control logic 108 that is configured to acquire a message code from a captured image of a print advertisement. In another implementation, UDA 90 can include bar code scanning functionality operative to read a bar code expressing a message code in the print media.

The message code can contain any type of data and can identify any of a number of items. For example, in one implementation the message code can identify the television station to which display device 95 is tuned (e.g., station call letters or a station identifier). In such an implementation, an advertisement or promotional message can then be identified using the station identifier and the time the station identifier was captured. In one implementation, UDA application site 50 can scan this information against a station log to resolve the advertising or other content the user was watching. UDA application site 50 can then return an advertising or promotional message associated with the broadcast advertising or other content.

As discussed herein, after a message code is acquired, UDA 90 can transmit the message code to UDA application site 50 which resolves the message code and pushes an electronic commerce and/or data message back to UDA 90. In one implementation, application server 52 receives a request including the message code and accesses promotional message database 56 to retrieve a promotional message associated with the message code. If a promotional message is located, application server 52 pushes the promotional message to UDA 90. Application server 52 can also carry out other functions such as tracking the user's interests and behavior. For example, application server 52 can generate a log, stored in association with the user's account, that records the message codes received from the user and the promotional messages sent in response. In one implementation, application server 52 can use the log to track system usage by the user to enable a fee-based service for advertisers. For example, an advertiser can be charged a fee for each promotional message pushed to a user's UDA 90. In addition, UDA application site 50, in one implementation, can be configured to transmit usage or activity reports to advertising system 62 detailing the activity associated with promotional messages and/or user purchasing behavior.

A user can perform a variety of actions with respect to the promotional message. The user can view the promotional message and simply discard it. Alternatively, the user can save the promotional message by storing it locally on UDA 90 or remotely in the user's account maintained at UDA application site 50. For example, the promotional message can be an electronic coupon that the user stores for later redemption at a POS terminal using UDA 90. Alternately, the electronic coupon can be used by accessing merchant system 50 using client computer 64.

UDA 90 can provide the user with management or organizational functionality in connection with the stored electronic coupons. In one implementation, navigation through stored electronic coupons can be facilitated through standard PDA user interface capabilities. For example, UDA 90 can enable a user to scan a list of categories and select one category to view. The user can then scan the stored electronic coupons in the selected category. UDA 90 can also enable a user to delete an electronic coupon or mark it for duplication in a special category, such as a shopping list category. UDA 90 can allow users to retrieve a list of coupons based on expiration date, so that a user can see which of her coupons is going to be invalid soon (e.g., a list of coupons expiring in two weeks can be generated). UDA 90 can also use its short-range wireless capabilities to provide easy access to a Universal Product Codes (UPC) for stored coupons at a POS terminal. In one implementation, once a coupon has been redeemed, it is automatically marked for deletion or it is automatically deleted. Electronic coupons that have expired can also be marked for deletion automatically. In one implementation, UDA 90 requires the user to explicitly invoke the batch deletion. In another implementation, UDA 90 automatically performs such batch deletions.

In one implementation, UDA 90 can be configured to facilitate financial transactions. UDA 90 can securely store a user's financial account information, such as credit card account numbers, debit card account numbers, checking account numbers, and other financial account information. In one implementation, this financial account information can be stored securely on UDA 90 to keep this information protected from others that may take possession of UDA 90 without the user's consent. Using a wireless transmission protocol, such as IrDA or Bluetooth, UDA 90 can transmit financial account information directly to a transaction processing device at a POS terminal, in addition to electronic coupons that can be transmitted as well. The transaction processing device can authorize or otherwise process the transaction in a conventional manner. In one implementation, UDA application site 50 can play a role in this type of purchase transaction. For example, UDA 90 can transmit data related to the purchase transaction to UDA application site 50 where it is logged in a financial transaction history maintained in the user's account. In addition, UDA application site 50 can be invoked to transmit a previously stored electronic coupon to UDA 90 to enable the user to redeem it at the POS terminal.

In another implementation, the user's financial account information can be stored and maintained at UDA application site 50. In one implementation, a purchase transaction at a POS terminal can be conducted by the user activating UDA 90 to request user account information from UDA application site 50. After the user account information is received, UDA 90 transmits the account information to the POS terminal as described above. Furthermore, UDA 90, as a WAP-enabled device for example, can be used to conduct transactions with merchant system 50. For example, UDA 90 can be configured to include electronic wallet functionality (operating independently or in connection with UDA application site 50) operative to facilitate on-line financial transactions with merchant system 50 over computer network 40.

As stated above, FIG. 3A illustrates one implementation of message carrier 200 on a television screen 96. The normal television image occupies most of screen 96. Message carrier 200 is used to present the message code and provides a target for image capture device 102 of UDA 90 to locate in order to acquire the message code. In the implementation of FIG. 3A, message carrier 200 uses a block-based encoding scheme resembling an overt checkerboard-like design, and the message code can be presented using a series of blocks within that checkerboard. Two or more colors can be used for the blocks, and the color state of the blocks achieves a binary encoding scheme. For example, black blocks can represent one bit value (e.g., a value of "0") and the white blocks can represent another bit value (e.g., a value of "1"). Alternately, transitions between blocks can be used to represent data. For example, a transition between from white to black and black to white may represent a '1' bit, while no transition (i.e., two adjacent blocks of the same color) may represent a "0" bit.

One or more features of message carrier 200 can be preset or constant to allow client application control logic 108 of UDA 90 to locate message carrier 200 in a captured image and then locate the message code within the message carrier. When the image processing functionality of client application control logic 108 reads and analyzes the intensity values of pixels in the captured image (e.g., using vertical scan lines or horizontal scan lines), these preset or constant features can be detected and message carrier 200 can then be identified. From there, the message code can then be identified and acquired.

In another implementation, the image processing functionality can reside on a remote server and the captured image can be transmitted to this remote server for processing. Such an implementation moves the burden of processing the digital image to a remote server that will typically have much greater processing power than UDA 90. The time required to process the captured image will then be reduced. UDA 90 can transmit the captured image to the remote server using any of the wireless technologies described herein, for instance, the captured image can be transmitted in an MMS message. If UDA application site 50 is used as this remote server, then a promotional message can be pushed to the user after processing of the image and acquisition of the message code has occurred. Otherwise, the remote server can simply transmit the acquired message code back to UDA 90 or directly to UDA application site 50.

In one implementation, message carrier 200 can have one or more borders 204 that remain constant as the message code changes. For example, the one or more borders 204 can be one continuous color such as black. This can aid the image processing functionality of client application control logic 108 in locating message carrier 200. In one implementation, a three-sided border 204 can be used around message carrier 200 to aid in its identification, where three-sided border 204 is one continuous color. As shown in FIG. 3A, message carrier 200 includes left, top, and bottom border regions 204 that are colored black or any other suitable color. Accordingly, the checkerboard region is bordered on three sides by a black color, and by the television image on the fourth side. The image processing functionality of client application control logic 108 can use three-sided border 204 to locate message carrier 200, and can then filter out three-side border 204 to extract the message code itself. As shown in FIG. 3B, in another implementation, three-sided border 204 can use two or more colors that maintain a constant pattern as the message code changes. The constant pattern can include a set of black-to-white or white-to-black transitions that can be detected by the image processing functionality of client application control logic 108 when it is trying to locate message carrier 200.

In one implementation, another portion of message carrier 200 can define a set of black-to-white or white-to-black transitions. For example, four blocks (not shown) can be located within three-sided border 204, and they can be oriented such that the top two squares are white and the bottom two squares are black. Image capture device 102 can then learn the white-to-black transition for message carrier

200 while scanning down the image. The white-to-black transition squares can be positioned so that the image processing functionality of client application control logic 108 can pick out the transition squares from the message code itself. In another implementation, the white-to-black transition squares used for defining transitions for can be located on border 204, such as in FIG. 3B.

Other implementations of message carrier 200 are possible. For example, in an implementation shown in FIG. 3C, message carrier 200 can be a vertical strip that runs along an edge of screen 96. As FIG. 3C illustrates, message carrier 200 can be oriented along the left side of screen 96; however, message carrier 200 can extend along any edge of screen 96, including the top, right, or bottom edges. Message carrier 200 can be formed using a small number of columns, typically ranging from one to four columns. Message carrier 200 shown in FIG. 3C uses three columns.

To allow UDA 90 to locate message carrier 200 when it is formed as a vertical strip, a three-sided border 204 similar to message carrier 200 can be used. Alternately, message carrier 200 can use a preset or constant pattern of blocks located at a predetermined position along the vertical strip to allow image capture device 102 to locate it. In one implementation, a set of blocks that are a single color can be positioned in the middle of the vertical strip at all times as the message code changes. The dimensions of the set of blocks can depend on the number of columns used in the vertical strip message carrier. As one of skill in the art will recognize, having the set of blocks in the middle of the vertical strip message carrier 200 will reduce the amount of processing required by image capture device 102 of UDA 90 when orientation and correlation variables are taken into consideration. In another implementation, vertical strip message carrier 200 can include black-to-white transitions at predetermined positions along the vertical strip for detection by the image processing functionality of client application control logic 108.

Figure 4A:
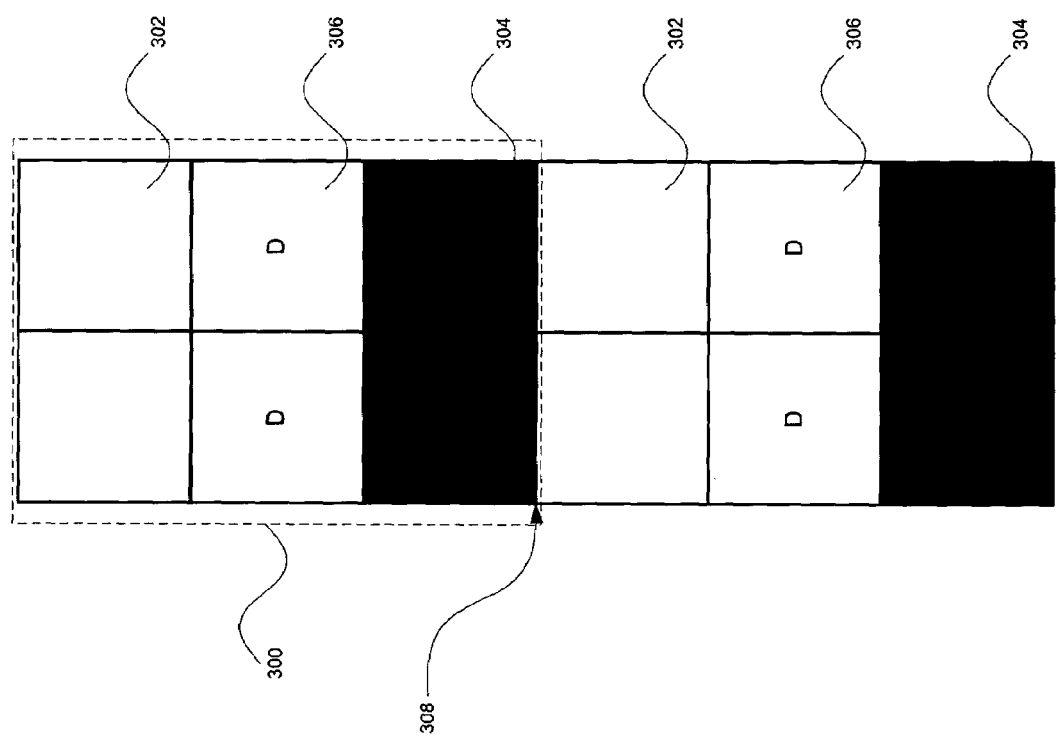
FIG. 4A illustrates two modules that are used for transmitting data in a message carrier.

In one implementation, notwithstanding any borders 204 used for identification by the image processing functionality of client application control logic 108, message carrier 200 can be constructed using a plurality of modules 300 as shown in FIG. 4A. Each module 300 provides two data bits of the message code. FIG. 4A illustrates two adjacent modules 300 that combine to provide four data bits of the message code. The blocks used to present data are labeled with a "D" in FIG. 4A.

In the implementation shown in FIG. 4A, each module 300 can be two blocks wide by three blocks high. The blocks need not be perfect squares. In FIG. 4A the top two blocks 302 are white while the bottom two blocks 304 are black. In other implementations, this order can be reversed or the blocks can use another set of colors. The middle two blocks are data blocks 306 that express two bits of data. As described above, data blocks 306 that are black can represent one bit value (e.g., a value of "0") and data blocks 306 that are white can represent another bit value (e.g., a value of "1"). This configuration can be reversed or other colors can be used to represent bits. Although black and white are preferred, other suitable colors can be used in the block-based encoding scheme.

Adjacent modules 300 provide a constant black-to-white transition 308 that is repeated at regular intervals. The black-to-white transition 308 occurs between the black bottom blocks 304 of the first module 300 and the white top blocks 302 of the adjacent module 300. The number of times a black-to-white transition occurs will depend on the number of modules 300 used to form the message code. In FIG. 4A, only two modules 300 are used so there is only one black-to-white transition 308. In FIG. 4B, six modules 300 form the message code yielding five black-to-white transitions 308.

The benefit of having black-to-white transitions 308 occur at regular intervals is that when a vertical column of pixels in the image is scanned and analyzed, these transitions 308 between dark-colored regions and light-colored regions can be readily identified by the image processing functionality of client application control logic 108. This provides another method by which the image processing functionality of client application control logic 108 can locate message carrier 200. And because the black-to-white transitions 308 are two blocks wide, the captured image of message carrier 200 does not have to be perfectly or substantially aligned for a vertical scan line of pixels to still pick up all of the transitions 308. A substantial amount of play or range is provided by having the black-to-white transitions 308 be two blocks wide. So even if the captured image is not properly aligned by the user, UDA 90 still has a good probability of identifying message carrier 200.

The number of bits required to express a given message code determines the number of data blocks that message carrier 200 must include. For instance, as shown in FIG. 4B, if twelve bits are needed to define or express a particular message code, then message carrier 200 must provide twelve data blocks 306. If modules 300 are being used to provide message carrier 200, then six modules 300 are required. In FIG. 4B, the twelve data positions are numbered from left to right and from top to bottom starting at D0. The data position numbers, in one implementation, correlate exactly to bit positions in a binary number. D0 and D1 make up the first row following this plan. The second row consists of D2 and D3. The pattern continues with D4 thru D11, and can continue beyond as more modules 300 are added. In other implementations, the number of data blocks 306 per module 300 can vary by increasing the number of columns used in message carrier 200. For example, using four columns in message carrier 200 allows each module 300 to have three columns (assuming one column is needed for border 204), and accordingly there are three data blocks 306 per module. Then if twelve data bits are required for the message code, only four modules 300 are needed.

In one implementation, UDA 90 executes a process to decode the message code that includes capturing an image of the display screen including the message carrier 200, analyzing vertical scan lines through the captured image to identify scan lines that intersect message carrier 200, locating and aligning an edge of message carrier 200, optionally validating one or more features surrounding the transitions, and reading the data bits in the message code.

As discussed above, UDA 90 includes image capture device 102 to capture a digital image of display screen 96 containing message carrier 200. The user aims image capture device 102 at a television that is displaying message carrier 200, then the user triggers the capture functionality to capture a digital image. The image can be pre-processed to indicate which pixels are white, which pixels are black, and which pixels are neither (i.e., a middle tone), thus reducing each pixel to a two-bit value (e.g., 11 for a white pixel, 10 for a black pixel, and 00 for a middle tone pixel). The middle tone should generally represent much of the television image and any surrounding items in the camera image.

In one implementation, the image processing functionality of client application control logic 108 locates message carrier 200 using black-to-white transitions that are located within border 204 or in modules 300. For example, if message carrier 200 is a checkerboard-design, then the black-to-white transitions 308 can be in border 204. If, however, message carrier 200 is a vertical-stripe design formed using modules 300, then the black-to-white transitions 308 can be formed between modules 300. After the digital image is captured, and optionally pre-processed, the image processing functionality operates to find a vertical scan line through the digital image that has crossed all of the black-to-white transitions 308 in message carrier 200. FIG. 5 illustrates the concept of finding a vertical scan line that has passed through the black-to-white transitions 308 of message carrier 200. In FIG. 5, vertical scan line 400 has passed through all of the black-to-white transitions 308 of a message carrier 200 formed using modules 300, while vertical scan lines 402 miss all of the transitions. As shown in FIG. 5, the vertical scan lines do not have to be perfectly vertical. The vertical scan lines can be tilted to improve the chances of finding message carrier 200 in the event that message carrier 200 is not aligned correctly in the captured digital image.

Starting at the top left of the captured image, the image processing functionality analyzes each vertical scan line (i.e., each column of pixels) for a desired pattern. In one implementation, the desired pattern is the correct number of black-to-white transitions 308, spaced at regular intervals, with only a negligible quantity of middle tone pixels between the top and bottom transitions 308. If one scan line does not contain the desired pattern, the image processing functionality moves to the next scan line, which is typically a few pixels to the right, and repeats the process.

In another implementation, the image processing functionality uses a pure brute force technique of trying every option for vertical scan lines, using substantially vertical scan lines as well as a range of tilted scans. In another implementation, when the image processing functionality locates some but less than all of the transitions 308 in a single scan, the partial success can be used as a clue that the correct data is near, and some effort to attempt various tilts at or near this point can be used to speed the identification process.

For example, in one such implementation, the image processing functionality analyzes successive vertical scan lines of pixels until the transition pattern, or at least part of the transition pattern, is located. An example of locating part of the transition pattern can mean to locate a vertical scan line crossing some but not all of the transitions 308 where the transitions 308 are spaced at regular intervals with no significant middle tones interspersed between transitions 308. This situation can be caused by the vertical scan line passing somewhat diagonally across message carrier 200. Next, the image processing functionality records the position (e.g., row and column) of the first detected transition 308 and the last detected transition 308 in the vertical scan line. The transitions should be detected over a range of successive vertical scan lines, since it will take several vertical scan lines to cover message carrier 200.

In another implementation, the image processing functionality analyzes vertical scan lines to find a solid border 204. In this implementation, the image processing functionality is looking for a large range of pixels that are all the same color.

In an implementation, border 204 can be made wider or taller than the blocks that form the message code. Using an over-sized border improves the likelihood of a vertical scan line passing through border 204 in its entirety when the image processing functionality is trying to locate message carrier 200. Since the captured image may not be properly aligned, depending on how the user was holding the image capture device 102 when the image was captured, the vertical scan lines may be at an angle relative to message carrier 200 and border 204. The use of an over-sized border 204 increases the range of allowable angles for the vertical scan lines relative to border 204 where a vertical scan line can still pass through an entire border 204.

Turning to FIG. 6, for the image processing functionality to correctly orient the vertical scan lines relative to message carrier 200, it must first locate the center 600 of message carrier 200. For message carriers using transitions 308, a plurality of vertical scan lines containing transitions 308 are taken and analyzed to determine the position of center 600. A range of adjacent vertical scan lines 602 are identified as containing all of the transitions 308 with no substantial middle tones interspersed, while vertical scan lines 602 bordering these adjacent scan lines 602 on the left and right are identified as containing fewer of the transitions 308. The bordering vertical scan lines 602 therefore do not pass through the entirety of message carrier 200. The image processing functionality can then approximate the corners of message carrier 200 by locating the highest detected transition point 606, the lowest detected transition point 608, the left-most detected transition point 610, and the right-most detected transition point 612.

With the corners approximated, the image processing functionality identifies the row value for center 600 of message carrier 200 by calculating the row value halfway between the row values for the highest and lowest detected transition points 606 and 608. This can be done simply by averaging the row values of highest transition point 606 and lowest transition point 608. Similarly, the column value of center 600 can be calculated using the column values for left-most transition point 610 and right-most transition point 612. Once these row and column values have been calculated, the location of center 600 is substantially known. Please note that the center 600 can be slightly offset because the true corners of message carrier 200 are not used.

When detecting the corners of message carrier 200, in one implementation only the adjacent vertical scan lines 602 containing all of the transitions 308 are used. In other implementations, the bordering vertical scan lines 602 can be used in identifying corners only if they contain a predetermined minimum number of the transitions 308. This restriction reduces the possibility that a vertical scan line containing a false transition is used erroneously.

If the column value of highest detected transition point 606 is to the right of the column value of calculated center 600, and the column value of lowest detected transition point 608 is to the left of the column value of calculated center 600, then the image processing functionality can tilt the vertical scan lines 602 counterclockwise to align them with message carrier 200. If the opposite is true (i.e., highest detected transition point 606 is to the left of center 600 and lowest detected transition point 608 is to the right of center 600), the image processing functionality can tilt the vertical scan lines clockwise. The tilted vertical scan lines can rescan message carrier 200 to determine whether they are properly aligned such that all of the vertical scan lines intersecting message carrier 200 now detect all of the transitions 308 and there is not a single highest detected transition point 606 or a single lowest detected transition point 608. If this is not the case and there are still single highest and lowest transition points, the tilting process can be repeated.

If there is no single highest detected transition point 606 or lowest detected transition point 608, and a number vertical scan lines have the same highest and lowest detected transitions, then message carrier 200 is properly aligned. This means that there are no bordering vertical scan lines 602 that contain less than all of the transitions 308. Since message carrier 200 is properly aligned, a vertical scan line will generally have all of the transitions or none. If the captured image cannot be scanned to yield the required transitions or data, the image processing functionality recommends that another digital image be captured. Otherwise, adjustments can be made to the pre-processing algorithm and the process can be repeated.

Once the vertical scan lines are aligned with message carrier 200, the left edge of modules 300 can be located to provide for more accurate reading of data blocks 306 that form the message code. In one implementation, the image processing functionality finds white blocks 302 and then scans to the left of the white blocks 302 to locate black border 204. For example, the image processing functionality can analyze the vertical scan lines to locate the position of white blocks 302 adjacent to the highest detected transition 308. The image processing functionality locates the middle of the white blocks 302 by first assuming that the width of white blocks 302 equals one-third of the vertical distance between transitions 308, and then moving half that width (i.e., one-sixth of the vertical distance between transitions 308) down to reach the center row of white blocks 302. The image processing functionality then scans to the left on the row of pixels just identified until a point on black border 204 is noted. The image processing functionality then repeats this process for the white blocks 302 adjacent to the lowest transition 308. Once this second point on black border 204 is noted, the vertical line joining these two points will be the left edge of modules 300.

The vertical distance between transitions 308 defines the scale for message carrier 200. In one implementation, horizontal distances can be calculated using the vertical dimensions times a scale factor for the aspect ratio of the camera. For example, if the horizontal pixel and the vertical pixel pitches are identical, a ratio of 1:1 exists. Then the vertical distance between transitions 308, divided by three, is the feature size assuming square blocks and that between transitions 308 are three features, a white block 302, a black block 304, and a data block 306 sandwiched between the two.

As an optional step, the image processing functionality, in one implementation, can validate the black and white blocks by testing pixel values at a series of points. Specifically, the image processing functionality goes to the middle of white blocks 302 or black blocks 304 and verifies that they are the color that they are expected to be.

The left edge of modules 300 is determined as explained above, and the center rows of data blocks 306 are located vertically halfway between transitions 308. Accordingly, the image processing functionality has the information it needs to read the data bits forming the message code out of message carrier 200. Using vertical scan lines, the image processing functionality reads data blocks 306. The vertical scan lines pass through the horizontal centers of data blocks 306. These horizontal centers can be determined using the width of the data blocks 306 and the location of the left edge of modules 300. The width of data blocks 306 can be calculated based on the height of data blocks 306 (given from the vertical distance between transitions 308) and the scale of width to height of the blocks. For instance, since the height of each block 306 is one third the distance between transitions 308, and assuming a 1:1 aspect ratio of width to height (or correcting for any deviation from that), the distance from the left edge of module 300 to the horizontal center of data block 306 can be calculated. The horizontal center of the next data block 306 will be three times that distance from the same left edge of module 300.

The data value for each bit (D0 . . . Dn) can be determined by a range of intensity values, such as 0 to 20 IRE units (International Radio Engineers) for a "0" bit and 80 to 100 IRE units for a "1" bit. Of course, other ranges and thresholds can be used such as a single IRE unit threshold above which expresses a given bit value (0 or 1), while below expresses the opposite bit value. Bit D0 thru the highest bit is assembled, in one implementation, starting at the top left data position, moving to the right to finish the row and, then resetting the read position to the left and starting again at the next row down. In one implementation, the individual bits form at least one byte for storage and conversion to any convenient form. In one implementation, the decoding functionality attaches any framing bits and/or bytes desired and stores the data to memory for ultimate transmission.

In one implementation, a mask of a predetermined design or configuration is merged with the checkerboard message carrier 200 to obscure the otherwise stark checkerboard design. The outline mask, in one implementation, is substantially the same size as the checkerboard design. The mask can include a logo or any other suitable design and, in a one implementation, is translucent in overall appearance to allow for processing of the captured image to strip out the mask and acquire the message code. In one implementation, the translucence is achieved by creating a mask design where the illuminated pixels defining the mask are spaced from one another to obscure the checkerboard, but still allow for detection of bits after processing the captured image. Implementations of the invention involving a mask require an additional processing step. Specifically, after locating the merged mask and checkerboard message carrier 200, a processor operates to strip the mask from message carrier 200 before resolving the bits forming the message code. With knowledge of the mask design, a processor can strip the mask from message carrier 200 using standard image processing techniques.

Lastly, the invention has been described with reference to specific implementations. Other implementations of the invention will be apparent to those of ordinary skill in the art. It is, therefore, intended that the scope of the invention not be limited to the implementations described above.

What is claimed is:

1. An apparatus for receiving promotional messages comprising:
  a display;
  a digital image capturing device;
  a wireless communication system;
  a processor;
  a memory; and
  a client application, physically stored in the memory, for receiving promotional messages, comprising instructions operable to cause the processor and the wireless communication system to:
  capture an image of a message carrier using the digital image capturing device;
  process the image to acquire a message code from the message carrier wherein the instructions to process the image further comprise instructions operable to cause the processor to:
    read intensity values for pixels forming the image;
    locate the message carrier by analyzing the intensity values;
    locate the message code within the message carrier; and read intensity values for pixels forming the message code to acquire the message code;

transmit the message code to a remote system using the wireless communicaton system; and receive a promotional message using the wireless communication system based on the transmitted message code.

2. The apparatus of claim 1, wherein the intensity values are read by scanning substantially vertical columns of pixels forming the image.

3. The apparatus of claim 2, wherein the instructions to locate the message carrier comprise instructions operable to cause the processor and the wireless communication system to analyze the scanned vertical columns of pixels to identify one or more transitions between dark-colored regions and light-colored regions.

4. The apparatus of claim 2, wherein the instructions to locate the message carrier comprise instructions operable to cause the processor and the wireless communication system to analyze the scanned vertical columns of pixels to identity a dark-colored border.

5. An apparatus for receiving promotional messages comprising:

a display;
a digital image capturing device;
a wireless communication system;
a processor;
a memory; and
a client application, physically stored in the memory, for receiving promotional messages, comprising instructions operable to cause the processor and the wireless communication system to:

capture an image of a message carrier using the digital image capturing device wherein the message carrier comprises an identifying border and the message code, and wherein the identifying border comprises a dark-colored border around at least a portion of the message code;

process the image to acquire a message code from the message carrier;

transmit the message code to a remote system using the wireless communication system; and receive a promotional message using the wireless communication system based on the transmitted message code.

6. An apparatus for receiving promotional messages comprising:

a display;
a digital image capturing device;
a wireless communication system;
a processor;
a memory; and
a client application, physically stored in the memory, for receiving promotional messages, comprising instructions operable to cause the processor and the wireless communication system to:

capture an image of a message carrier using the digital image capturing device wherein the message carrier comprises an identifying border and the message code, and one or more transitions between dark-colored regions and light-colored regions;

process the image to acquire a message code from the message carrier;

transmit the message code to a remote system using the wireless communication system; and receive a promotional message using the wireless communication system based on the transmitted message code.

7. An apparatus for receiving promotional messages comprising:

a display;
a digital image capturing device;
a wireless communication system;
a processor;
a memory; and
a client application, physically stored in the memory, for receiving promotional messages, comprising instructions operable to cause the processor and the wireless communication system to:

capture an image of a message carrier using the digital image capturing device;

transmit the image to an image processing system using the wireless communication system wherein the image processing system is configured to:

receive the image;
read intensity values for pixels forming the image;
locate the message carrier by analyzing the intensity values;
locate a message code within the message carrier;
read intensity values for pixels forming the message code to acquire the message code; and
transmit the message code;

receive the message code from the image processing system based on the transmitted image;

transmit the message code to a promotional message system using the wireless communication system; and receive a promotional message from the promotional message system based on the transmitted message code.

8. An apparatus for receiving promotional messages comprising:

a display;
a digital image capturing device;
a wireless communication system;
a processor;
a memory; and
a client application, physically stored in the memory, for receiving promotional messages, comprising instructions operable to cause the processor and the wireless communication system to:

capture an image of a message carrier using the digital image capturing device;

transmit the image to a remote system using the wireless communication system wherein the remote system is configured to:

receive the image;
read intensity values for pixels forming the image;
locate the message carrier by analyzing the intensity values;
locate a message code within the message carrier;
read intensity values for pixels forming the message code to acquire the message code; and
transmit a promotional message based on the message code; and receive a promotional message from the remote system based on the transmitted image.

9. A computer program product, physically stored on a machine-readable medium, for receiving promotional messages, comprising instructions operable to cause a programmable processor to:

capture an image of a message carrier using the digital image capturing device;

process the image to acquire a message code from the message carrier wherein the instructions to process the image further comprise instructions operable to cause a programmable processor to:
read intensity values for pixels forming the image;
locate the message carrier by analyzing the intensity values;
locate the message code within the message carrier; and
read intensity values for pixels forming the message code to acquire the message code;

transmit the message code to a remote system using the wireless communication system; and
receive a promotional message using the wireless communication system based on the transmitted message code.

* * * * *